(12) United States Patent
Chino et al.

(10) Patent No.: US 6,642,291 B2
(45) Date of Patent: Nov. 4, 2003

(54) VISCOELASTICITY IMPROVING AGENT FOR RUBBER AND RUBBER COMPOSITION CONTAINING THE SAME

(75) Inventors: Keisuke Chino, Hiratsuka (JP); Naoshi Miyashita, Hiratsuka (JP); Makoto Ashiura, Hiratsuka (JP); Tetsuji Kawazura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 154 days.

(21) Appl. No.: 09/859,488

(22) Filed: May 18, 2001

(65) Prior Publication Data

US 2002/0016391 A1 Feb. 7, 2002

(30) Foreign Application Priority Data

| May 25, 2000 | (JP) | ........................... 2000-159560 |
| Jun. 27, 2000 | (JP) | ........................... 2000-192061 |
| Aug. 28, 2000 | (JP) | ........................... 2000-263263 |

(51) Int. Cl.$^7$ ............................................. C08G 63/48
(52) U.S. Cl. ................. 524/196; 524/190; 524/236; 524/260; 524/572
(58) Field of Search .................... 524/196, 236, 524/260, 572, 190

(56) References Cited

U.S. PATENT DOCUMENTS

| 5,506,319 A | * | 4/1996 | Takizawa ..................... 526/248 |
| 5,508,336 A | * | 4/1996 | Takeichi et al. ............. 524/496 |
| 5,576,376 A | * | 11/1996 | Shibata et al. .............. 524/495 |
| 5,587,420 A | * | 12/1996 | Takizawa et al. ........... 524/572 |
| 6,084,015 A | * | 7/2000 | Chino et al. ................ 524/189 |

FOREIGN PATENT DOCUMENTS

JP          08-239510         6/1996

* cited by examiner

Primary Examiner—David W. Wu
Assistant Examiner—Henry S. Hu
(74) Attorney, Agent, or Firm—Arent Fox Kintner Plotkin & Kahn PLLC (57) ABSTRACT

A viscoelasticity improving agent for rubber obtained by reacting an alkyllithium compound with a free radical compound having an isocyanate group in the molecule thereof and existing stably at room temperature in the presence of oxygen and a rubber composition.

8 Claims, 1 Drawing Sheet

VISCOELASTICITY IMPROVING AGENT FOR RUBBER AND RUBBER COMPOSITION CONTAINING THE SAME

BACKGROUND OF THE INVENTION

1. Field of the Invention

The present invention relates to a viscoelasticity improving agent for rubber and a rubber composition containing the same. More particularly, the present invention relates to a viscoelasticity improving agent for rubber obtained by reacting an alkyllithium with a free radical-containing compound having an isocyanate group in the molecule thereof and stable under an ordinary temperature and in the presence of oxygen and also to a rubber composition containing the same. The preferable rubber composition of the present invention has low heat buildup and a good tangent delta (tan δ) balance.

2. Description of the Related Art

A free radical-containing compound (i.e., sometimes "free radical compound") which exist stably at room temperature in the presence of oxygen is already known. For example, Japanese Unexamined Patent Publication (Kokai) No. 8-239510 discloses use of a stable free radical to inhibit deterioration and stabilize a polymer by a mechanism not involving oxygen. Japanese Unexamined Patent Publication (Kokai) No. 4-328113 discloses a rubber composition containing a synthetic rubber obtained using an organic lithium polymerization initiator, of which Li ends are trapped with an isocyanate.

Japanese Unexamined Patent Publication (Kokai) No. 10-182881, which is based upon an application filed previously by the inventors, discloses a rubber composition obtained by blending a free radical-containing compound containing a nitroxide radical, hydrazyl radical, allyloxyl radical, and/or trytyl radical having a strong radical trapping function in the rubber composition and providing superior processability, high grip, and low heat buildup, protected from oxidation deterioration at the time of abrasion, and improved in abrasion resistance. Further, Japanese Unexamined Patent Publication (Kokai) No. 11-43557 discloses a rubber composition obtained by blending a rubber with a compound containing a radical having an amino group, isocyanate group, hydroxyl group, carboxyl group, oxirane group, and/or thiirane group such as a nitroxide radical, hydrazyl radical, allyloxyl radical, and/or trytyl radical and existing stably at room temperature in the presence of oxygen, having a superior processability, improved abrasion resistance, and a superior balance of high wet braking performance and rolling resistance (tan δ balance). Further, Japanese Patent Application No. 11-57101 discloses a rubber such as rubber stabilized with a free radical compound such as a nitroxide, hydrazyl, allyloxyl radical, trytyl radical, etc. containing an iminium salt.

For example, a stable free radical compound such as 2,2,6,6-tetramethylpiperidinyloxy (TEMPO) is able to quickly trap radicals formed by cleavage of rubber by light, heat, or mechanical action, and therefore is known to improve the processability. However, it was found that the trapping of the radicals increases the number of ends of the rubber and tends to decrease the physical properties of the rubber.

Various attempts have been made to improve the properties of products made from rubber compositions, in particular tires. The assignee disclosed rubber compositions containing radical compounds as rubber compositions superior in processability and giving a high abrasion resistance and superior balance between high wet braking performance and low rolling resistance when made into tires in Japanese Unexamined Patent Publication (Kokai) No. 10-282881 and Japanese Unexamined Patent Publication (Kokai) No. 11-43557.

However, there have been increasingly strong demands for reducing fuel consumption in cars derived from global environmental issues and needs for energy saving. Further reduction of the rolling resistance, that is, further reduction of heat buildup, has been sought in rubber compositions.

In the past, rubber compositions using free radical compounds containing radicals such as a nitroxide radical and hydroxide radical (Japanese Unexamined Patent Publication (Kokai) No. 10-182881) or compounds containing free radical compounds having isocyanate groups (Japanese Unexamined Patent Publication (Kokai) No. 11-43557) have been known. On the other hand, rubber compositions using elastomers modified by tin (Japanese Unexamined Patent Publication (Kokai) No. 5-112674, Japanese Unexamined Patent Publication (Kokai) No. 7-18125, Japanese Unexamined Patent Publication (Kokai) No. 10-95873, etc.) have also been known. No rubber composition which improves various physical properties by using these two ingredients has yet been known.

SUMMARY OF THE INVENTION

An object of the present invention is to provide a viscoelasticity improving agent for rubber which can suppress the increase in the number of rubber ends due to radical trapping, whereby a decrease in physical properties of rubber is prevented, and also to provide a rubber composition containing the same.

Another object of the present invention is to provide a rubber composition superior in low heat buildup.

Still another object of the present invention is to provide a rubber composition having improved physical properties of rubber by blending a suitable quantity of a free radical compound introducing functional groups capable of reacting with functional groups on the surface of carbon black into a rubber composition containing a Sn coupling rubber with a large ability to produce end radicals at the time of mastication.

In accordance with the present invention, there is provided a viscoelasticity improving agent for rubber obtained by reacting an alkyllithium compound with a free radical compound having at least one isocyanate group in the molecule thereof or an analogous compound and stable at an ordinary temperature in the presence of oxygen.

In accordance with the present invention, there is provided a viscoelasticity improving agent for rubber comprised of a free radical compound having in the molecule thereof a functional group represented by formula (I) and/or formula (II):

wherein R is a $C_1$ to $C_{20}$ alkyl group or aryl group and existing stably at room temperature in the presence of oxygen.

In accordance with the present invention, there is further provided a rubber composition comprising 100 parts by weight of at least one starting diene rubber and at least 10 parts by weight of at least one reinforcing agent and at least 0.01 part by weight but less than 1 part by weight of a radical-containing compound containing at least one radical having at least one isocyanate group selected from the group consisting of a nitroxide radical, hydrazyl radical, allyloxyl radical, and trytyl radical and existing stably at room temperature in the presence of oxygen.

In accordance with the present invention, there is still further provided a rubber composition comprising 100 parts by weight of at least one starting Sn coupling diene rubber and 0.01 to 1 part by weight of at least one compound selected from the group consisting of those having a nitroxide radical, hydrazyl radical, allyloxyl radical, and trytyl radical having, in the molecule thereof, at least one substituent of an isocyanate group, amino group, hydroxyl group, carboxyl group, oxirane group, thiirane group, ester group, and amide group and which exists stably at room temperature in the presence of oxygen.

In accordance with the present invention, there is still further provided a rubber composition comprising 100 parts by weight of at least one starting Sn coupling diene rubber and 0.01 to 1 part by weight of a nitroxide radical, hydrazyl radical, allyloxyl radical, and trytyl radical having, in the molecule thereof, an isocyanate group and/or amino group or an analogus compound and existing stably at room temperature in the presence of oxygen.

It must be noted that, as used in the specification and the appended claims, the singular forms "a," "an" and "the" include plural referents unless the context clearly dictates otherwise. Thus, for example, reference to "a free radical compound" includes mixtures of free radical compounds.

BRIEF DESCRIPTION OF THE DRAWINGS

The present invention will be better understood from the description set forth below, with reference to the accompanying drawing of FIG. 1(A) to 1(D) which schematically illustrate a mechanism for preventing deterioration or aging of rubber in a rubber composition according to the present invention.

DESCRIPTION OF THE PREFERRED EMBODIMENTS

The present inventors found that, by introducing an NCO group into the above-mentioned stable free radical compound such as TEMPO and reacting an alkyllithium compound therewith to introduce an NCO-RLi addition group into the molecule, it is possible for the functional group to react with the hydroxyl groups or carbonyl groups etc. on the surface of carbon black, and therefore the ends of the trapped rubber react with the filler (i.e., carbon black, silica, etc.) to prevent an increase in the number of ends of the rubber molecules, produce a strong carbon gel, whereby the physical properties of the rubber are improved.

The viscoelasticity improving agent for rubber according to the present invention can be obtained by reacting an alkyllithium compound, preferably an alkyllithium compound RLi having a $C_1$ to $C_{20}$ alkyl group or aryl group, particularly butyllithium, with a free radical compound having an isocyanate group in its molecule thereof and existing stably at room temperature in the presence of oxygen. Examples of the free radical compound are a nitroxide radical compound, for example, the NCO content of the above TEMPO (2,2,6,6-tetramethylpiperidinyloxy)

or a reaction product of a free radical having a substituent capable of reacting with an isocyanate group (for example, OH, $NH_2$, NHR, SH, etc.) and polyisocyanate. Specifically, it is possible to synthesize the same by a reaction as shown in the following Examples. The compound obtained is a free radical compound having a functional group having the above formulae (I) and/or (II) and existing stably at room temperature in the presence of oxygen.

As a TEMPO derivative having reactivity with the above NCO, for example the following compounds may be mentioned.

As the method for introducing isocyanate groups into these TEMPO derivatives, the method for causing a reaction with a polyfunctional isocyanate and leaving a part of the isocyanate groups is effective.

As the polyfunctional isocyanate compound, the following compounds may be mentioned:

Bicycloheptane triisocyanate

The organolithium compounds usable in the present invention include, for example, n-butyllithium, sec-butyllithium, tert-butyllithium, methyllithium, phenyllithium, benzyllithium, hexyllithium, stearyllithium, etc.

The rubber blended as the main ingredient into the rubber composition according to the present invention may be any diene rubber generally blended into various rubber compositions in the past such as natural rubber (NR), polyisoprene rubber (IR), various styrene-butadiene copolymer rubbers (SBR), various polybutadiene rubbers (BR), acrylonitrile-butadiene copolymer rubber (NBR), butyl rubber (IIR), ethylene-propylene-diene copolymer rubber (EPM, EPDM), which may be used alone or in any mixture thereof.

Figure 1:
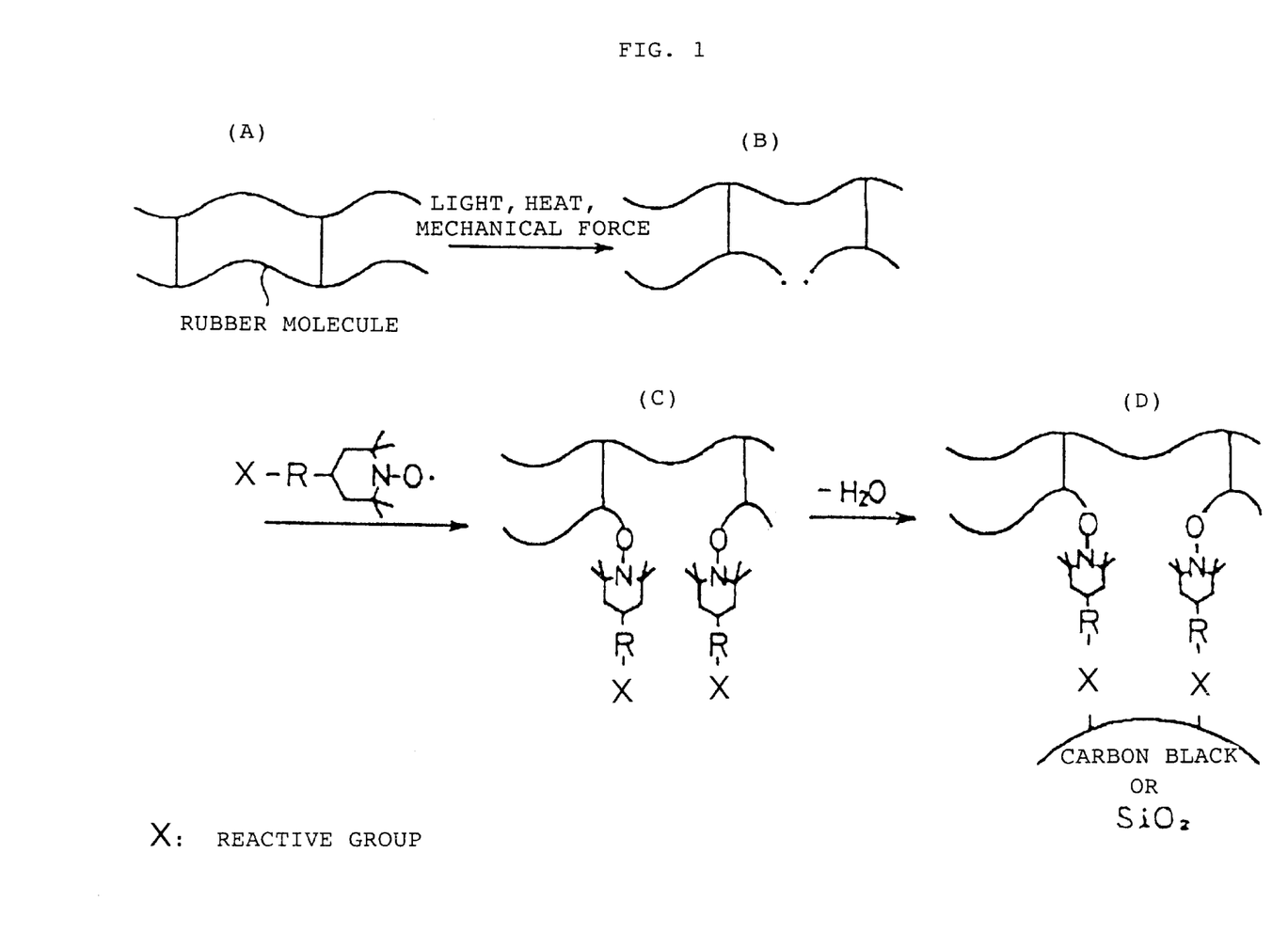

As shown in FIG. 1, when the cross-linked structure rubber molecule (see FIG. 1(A)) generates radicals due to cleavage of the rubber molecule by light, heat, or mechanical action (see FIG. 1(B)), the radicals are immediately trapped by the radical containing compound as shown in FIG. 1(C), and therefore, when a radical containing compound is blended with the rubber composition, it is possible to effectively prevent the phenomena of deterioration or aging of rubber caused by the formation of free radicals in the rubber molecule.

However, the trapping of the radicals results in an increase in the number of rubber ends and, as a result, the physical properties of the rubber tend to get worse. Thus, in the present invention, isocyanate groups capable of reacting with the hydroxyl groups or carbonyl groups etc. on the surface of the reinforcing agent such as carbon black or silica and having an extremely large reactivity are introduced into the radical-containing compound, as shown in FIG. 1(D), whereby the trapped rubber ends are reacted with the surface of the carbon black (or silica) and an increase in the number of ends can be prevented. Thus, strong carbon gel (or gel with silica) is formed and the physical properties of the rubber are improved.

If the content of the radical-containing compound is too large, the rebonding of the once cleaved rubber is suppressed and the molecular weight of the rubber is excessively decreased, and therefore, even if the rubber is bonded with the reinforcing agent, the physical properties of the rubber composition get worse.

Accordingly, in the present invention, it was found that, when the amount of radical-containing compound is blended in a very small amount and the excessive decrease in the molecular weight of the rubber is suppressed, without suppressing the rebonding of the rubber that much, the tan δ of the rubber composition is decreased and the amount of heat buildup is suppressed. Thus, it was learned that this rubber composition could be effectively used for a low heat buildup rubber composition suitable for use in the manufacture of tires etc. Further, the improvement of the other physical properties such as the abrasion resistance is observed.

The reinforcing agents to be blended in the rubber composition according to the present invention include, for example, carbon black and silica. At least 10 parts by weight, preferably 20 to 60 parts by weight, of the reinforcing agent are blended based upon 100 parts by weight of the diene rubber. If the blending amount is too small, the reinforcing properties required for the rubber composition is not always obtained.

The carbon black usable in the rubber composition according to the present invention has a nitrogen adsorption specific area ($N_2SA$) of, preferably, 20 to 200 $m^2/g$, more preferably, 50 to 170 $m^2/g$, and a DBP oil absorption of, preferably, 60 to 130 ml/100 g, more preferably 80 to 120 ml/100 g.

The silica usable in the rubber composition according to the present invention may be any silica (or white carbon) suitable for use in rubber formulations and has an $N_2SA$ of preferably 80 to 300 $m^2/g$, more preferably 100 to 250 $m^2/g$, and a DBP oil absorption of, preferably, 100 to 300 ml/100 g, more preferably, 120 to 250 ml/100 g.

Note that the methods for measurement of the properties of the carbon black and silica are as follows:

a) Nitrogen adsorption specific area ($N_2SA$)

This is measured according to ASTM-D3037-78 "Standard Methods of Treating Carbon Black- Surface Area by Nitrogen Adsorption" Method C.

b) DBP oil absorption

This is measured by ASTM-D3493.

According to the present invention, when 100 parts by weight of a diene rubber is blended with at least 0.01 part by weight but less than 1 part by weight, preferably 0.01 part by weight to 0.5 part by weight, particularly preferably 0.01 part by weight to less than 0.1 part by weight, of a radical-containing compound containing at least one radical having at least one isocyanate group selected from the group consisting of a nitroxide radical, hydrazyl radical, allyloxyl radical and trytyl radical and existing stably at room temperature in the presence of oxygen, the effects of low heat buildup and abrasion resistance of the present invention are obtained.

As the radical containing compounds usable in the present invention, the following compounds may be illustrated.

Substituted nitroxide radical (piperidinyloxy) (see formula III)

(III)

wherein R indicates at least one member of C, O, N, S, P, $C_1$ to $C_{30}$ alkylene groups and $C_6$ to $C_{30}$ aryl groups or a single bond, $R^1$ to $R^4$ independently indicate hydrogen or $C_1$ to $C_4$ alkyl group such as a methyl group, ethyl group, and n indicates an integer from 1 to 6.

Typical examples of the substituted nitroxide radical containing compound shown in formula (III) are given below:

The use of a compound containing a tetramethylpiperidinyloxy radical as shown in the above chemical formulae is preferable, in view of reactivity, stability, conventional use, and economy.

Further, a radical having a urethane bond (i.e., —NHCOO—) as shown in the above chemical formulae is preferable in view of the improvement of the affinity with the reinforcing agent such as carbon black, silica. There is a similar tendency in radical-containing compounds other than substituted nitroxide radical-containing compounds.

Substituted nitroxide radical (pyrrolidinyloxy) (see formula (IV) or (V))

(IV)

(V)

wherein R, $R^1$ to $R^4$ and n are as defined above.

Typical examples of the substituted nitroxide radical-containing compound shown in formula (IV) or (V) are given below:

3-isocyanate-2,2,5,5-tetramethyl-3-pyrroline-1-yloxy 3-isocyanate-2,2,5,5-tetramethyl-3-pyrrolidinyloxy

As examples of the other nitroxide radicals, the substituted forms of the following radical compounds may be mentioned as nitroxide radical-containing compounds according to the present invention.

Diphenylnitroxy

4,4'-dinitro-diphenyloxy

Bamfield-Kenyon radical

Fermi salt

Porphilexide

As examples of a radical-containing compound having a hydrazyl radical, the following substituted forms of radical compounds may be mentioned:

2,2-diphenyl-1-picrylhydrazyl

2,2-di(4-tert-octylphenyl)-1-picrylhydrazyl)

As examples of a radical-containing compound having an allyloxyl radical, the following substituted forms of radical compounds may be mentioned:

Triphenylphenoxyl

-continued

Garvinoxyl

5,12-diphenyl-7-oxyldinaphtha-[1,2-b-2',3-d] furan

As examples of a radical-containing compound having a trytyl radical and its analogs, the following substituted forms of radical compounds may be mentioned:

α,γ-bisdiphenylene-β-phenylallyl

As explained above, when a cross-linked structure rubber molecule is exposed to light, heat, or mechanical action, the rubber molecule cleaves and radicals are formed, and therefore, the rubber degrades or ages. Thus, when a radical-containing compound is blended into the rubber composition in advance, the radicals formed are immediately trapped by the radical-containing compound, and therefore, the phenomenon of deterioration and aging of rubber arising due to the generation of free radicals in the rubber molecules can be effectively prevented.

However, when mixing a composition, the number of ends of rubber increase due to this radical trapping and, as a result, the physical properties of the rubber tend to decrease. Therefore, in the present invention, by blending, into the rubber composition, a radical compound having functional groups capable of reacting with the hydroxyl groups or carbonyl groups etc. on the surface of the reinforcing agent such as carbon black, silica, the trapped rubber ends react with the carbon black (or silica). Therefore, it is possible to prevent an increase in the number of the ends of rubber and to produce a strong carbon gel (or gel with silica), whereby the physical properties of the rubber is improved. Further, in the present invention, by using a Sn coupling diene rubber for the rubber ingredient of the rubber composition and using the Sn coupling diene rubber with the above specific radical compound, the free ragical compounds trap the chain ragicals generated from the cleavage of the bonds between Sn and the rubber chain and the functional groups were introduced at the ends of the rubber, whereby it is possible to remarkably improve the physical properties of the rubber, in particular the tan δ balance.

In the rubber composition according to a preferred embodiment of the present invention, the Sn coupling diene rubber is used alone or in combination with an unmodified diene rubber. The Sn coupling diene rubber is preferably included in a ratio of 50 to 100 parts by weight, more preferably 80 to 100 parts by weight, of the total weight of the rubber. The rubber blended with the Sn coupling diene rubber may be any diene rubber generally blended into various rubber compositions in the past.

As the Sn coupling diene-based rubber used in the present invention, for example, it is preferable to use an Sn coupling styrene/butadiene copolymer. This may be produced by a known method (for example, Japanese Unexamined Patent Publication (Kokai) No. 63-308011). That is, it is possible to produce the Sn coupling styrene/butadiene copolymer by copolymerizing styrene and butadiene by the solution polymerization method (i.e., living polymerization method) using an organolithium compound as a polymerization initiator in a hydrocarbon solvent to obtain a copolymer containing butadiene-lithium bonds at the polymerization ends, then causing a coupling reaction with, for example, a halogenated tin compound. Further, the Sn coupling styrene/butadiene copolymer may be obtained commercially such as from Japan Synthetic Rubber under the tradename SL599.

For the radical compound having functional groups to be blended in the rubber composition of the present invention, 0.01 to 1 part by weight, preferably 0.01 to 0.5 part by weight, based upon 100 parts by weight of the rubber, of a nitroxide radical, hydrazyl radical, allyloxyl radical, trytyl radical, and analogous compounds having, in the molecule thereof at least one substituent selected from the group consisting of an isocyanate group, amino group, hydroxyl group, carboxyl group, oxirane group, thiirane group, ester group, and amide group and existing stably at room temperature in the presence of oxygen. If the amount of the radical compound is less than 0.01 part by weight, the desired improvements in the properties cannot be exhibited, while if more than 1 part by weight is used, rebonding of the once cleaved rubber is suppressed, the molecular weight is decreased too much, and the physical properties of the rubber are decreased.

As radical compounds usable in the present invention, the following compounds may be mentioned:

1) Nitroxide radical shown by the following formula (VI) (pyrrolidinyloxy radical)

(VI)

wherein R indicates at least one member of C, O, N, S, P, $C_1$ to $C_{30}$ alkylene groups and $C_6$ to $C_{30}$ aryl groups, or a single bond, $R^1$ to $R^4$ independently indicate hydrogen, $C_1$ to $C_4$ alkyl group such as a methyl group, ethyl group, X indicates a substituent having at least one substituent selected from the group consisting of an isocyanate group, amino group, hydroxyl group, carboxyl group, oxirane group, thiirane group, ester group, and amide group, and n is an integer of 1 to 6).

Typical examples of the nitroxide radical having the formula (VI) are given below:

-continued

2) Nitroxide radicals shown by the following formulas (VII) and (VIII) (pyrrolidinyloxy radicals)

(VII)

or (VIII)

wherein R, $R^1$ to $R^4$, X, and n are as defined above.

Typical examples of nitroxide radicals having formulas (VII) and (VIII) are given below:

3) As examples of nitroxide radicals, substituted forms of the above nitroxide radicals may be used as the nitroxide radical compound of the present invention.

4) As example of hydrazyl radicals, substituted forms of the above hydrazyl radicals may be used as the hydrazyl radical compound of the present invention.

5) As examples of allyloxyl radicals, substituted forms of the above allyloxyl radicals may be used as the allyloxyl radical compound of the present invention.

6) As examples of trytyl radicals, substituted forms of the above trytyl radicals may be used as the trytyl radical compound of the present invention.

The rubber composition of the present invention includes, as a reinforcing agent, the above-mentioned reinforcing agent, for example, carbon black or silica (preferably precipitated silica), in an amount of at least 10 parts by weight, preferably 20 to 60 parts by weight, based upon 100 parts by weight of the total weight of rubber. If the above amount is too small, the reinforcing property required for the rubber composition cannot be obtained.

The rubber composition of the present invention may further include, in addition to the above ingredients, a vulcanization agent, cross-linking agent, vulcanization accelerator, cross-linking accelerator, various types of oil, an antiaging agent, a plasticizer, and other various types of additives generally blended into a general use rubber. The blend may be made into a rubber composition by kneading and vulcanization by a general method and used for vulcanization or cross-linking. The amounts of the additives may be made the amounts generally used in the past in so far as they do not adversely affect the objects of the invention.

The rubber composition of the present invention may be suitably used for tires and for conveyor belts, hoses, rubber sheets, gloves, fenders, rollers, linings, rubberized cloth, sealing materials, and various other types of rubber products. In particular, it may be suitably used for the cap tread, under tread, and other parts of tires.

EXAMPLES

The present invention will now be further illustrated by, but is by no means limited to, the following Examples.

Examples 1 to 3 and Comparative Examples 1 to 2

Synthesis of Viscoelasticity Improving Agent for Rubber of Present Invention

1) Synthesis of TDL-TEMPO (See Formula A)

50.68 g of tolylene diisocyanate (TDI) was added to 50.0 g (0.291 mol) of OH-TEMPO (4-hydroxy-2,2,6,6-tetramethyl piperydinyloxy) dissolved in 50 ml of acetone. The mixture was stirred at room temperature for 24 hours. The isocyanate content was confirmed to be 11.96% (Note: theoretical value=12.13%). Next, 130 ml (2.47 mol/L) of n-hexane solution containing n-BuLi (0.321 mol) was added thereto. The mixture was heated and stirred for 1 hour. The content of isocyanate was confirmed to be 0% (Note: theoretical value=0%). The acetone was distilled off in vacuo and the resultant product was dried to obtain the desired product.

TDL-TEMPO

R.T. = Room Temperature

2) Synthesis of MDL-TEMPO (See Formula B)

72.7 g of diphenylmethane diisocyanate (MDI) was added to 50.0 g (0.291 mol) of OH-TEMPO dissolved in 50 ml of acetone. The mixture was stirred at room temperature for 24 hours. The isocyanate content was confirmed to be 9.46% (Note: theoretical value=9.95%). Next, 130 ml (2.47 mol/L) of n-hexane solution containing n-BuLi (0.321 mol) was added to this solution. The mixture was heated and stirred for 1 hour. The content of isocyanate was confirmed to be 0% (Note: theoretical value=0%). The acetone was distilled off in vacuo and the resultant product was dried to obtain the desired product.

R.T. = Room Temperature

3) Synthesis of HDL-TEMPO (See Formula C)

58.7 g of hexamethylene diisocyanate (HDI) was added to 60.0 g (0.349 mol) of OH-TEMPO dissolved in 60 ml of acetone. The mixture was stirred at room temperature for 72 hours. The isocyanate content was confirmed to be 13.43% (Note: theoretical value=12.34%). Next, 155 ml (2.47 mol/L) of n-hexane solution containing n-BuLi (0.383 mol) was added to this solution. The mixture was heated and stirred for 1 hour. The content of isocyanate was confirmed to be 0% (Note: theoretical value=0%). The acetone was distilled off in vacuo and the resultant product was dried to obtain the desired product.

(C)

R.T. = Room Temperature

Note that the following commercially available products were used for the compounds used for the synthesis explained above:

OH-TEMPO: LA7RD made by Asahi Denka Kogyo

TDI, MDI, HDI: all made by Sumitomo Bayer Urethane

Hexane solution of n-BuLi, methanol, acetone: all made by Kanto Chemical

Preparation of Samples

All of the ingredients in the formulation shown in Table I except for the vulcanization accelerator and sulfur were mixed in a 1.8 liter closed type mixer for 5 to 7 minutes. The resultant mixture was discharged when reaching 165±5° C. to obtain a master batch. The vulcanization accelerator and sulfur were mixed into the master batch by an 8-inch open roll to obtain a rubber composition.

The unvulcanized physical properties of the rubber composition thus obtained (Mooney viscosity) were measured. Next, the composition was pressed and vulcanized in a 15×15×0.2 cm mold at 160° C. for 10 minutes to prepare the desired test piece (i.e., rubber sheet). This was evaluated for vulcanized physical properties (extension viscoelasticity: tan δ (60° C.)). The results are shown in Table I.

The test methods for the unvulcanized physical properties and vulcanized physical properties of the compositions obtained in the Examples were as follows:

Unvulcanized Physical Properties

Mooney viscosity: This was measured at 100° C. based on JIS K 6300.

Vulcanized Physical Properties tan δ: This was measured using a viscoelasticity spectrometer (made by Toyo Seiki) under conditions of a temperature of 60° C., an initial strain of 10%, a dynamic strain of ±2%, and a frequency of 20 Hz. The tan δ at 60° C. is a measure of the grip on a dry road. The larger the value of the tan δ, the greater the grip of the tire.

TABLE I

| | Comp. Ex. 1 | Comp. Ex. 2 | Ex. 1 | Ex. 2 | Ex. 3 |
|---|---|---|---|---|---|
| NR[1] | 100 | 100 | 100 | 100 | 100 |
| Peptizer agent[2] | — | 0.15 | — | — | — |
| TDL-TEMPO[3] | — | — | 0.3 | — | — |
| MDL-TEMPO[4] | — | — | — | 0.3 | — |
| HDL-TEMPO[5] | — | — | — | — | 0.3 |
| Carbon HAF-HS[6] | 50 | 50 | 50 | 50 | 50 |
| Zinc White No. 3[7] | 3 | 3 | 3 | 3 | 3 |
| Stearic acid[8] | | | | | |
| Antiaging agent 6C[9] | 2 | 2 | 2 | 2 | 2 |
| | 1 | 1 | 1 | 1 | 1 |
| Oil extended powdered sulfur[10] | 2 | 2 | 2 | 2 | 2 |
| Vulcanization accelerator NS[11] | 1 | 1 | 1 | 1 | 1 |
| Mooney viscosity | 92.6 | 86.0 | 83.4 | 86.8 | 80.0 |
| tan δ (60° C.) | 0.154 | 0.151 | 0.147 | 0.146 | 0.148 |

Notes:
[1]Natural rubber (RSS#1)
[2]Ouchi Shinko Chemical, Noctizer SZK (mixture of zinc-2-benzamide thiophenate, metal chelating compound carrier, etc.)
[3]See formula A.
[4]See formula B.
[5]See formula C.
[6]Shoblack N339 made by Showa Cabot.
[7]Zinc White No. 3 made by Seido Chemical Industry etc.
[8]Copper bis-stearate made by NOC.
[9]Santoflex 6PPD (N-(1,3-dimethylbutyl)-N'-phenyl-p-phenylenediamine) made by Flexsys.
[10]Oil extended sulfur made by Karuizawa Refinery.
[11]Noccelar NS-P (N-t-butyl-2-benzothiazyl sulfenamide) made by Ouchi Shinko Chemical.

As explained above, according to the present invention, by blending, into a rubber composition, a stable specific free radical-containing organic compound having a strong radical trapping function, the free radicals of rubber formed during mixing are trapped. Further, the stable free radical-containing organic compound according to the present invention has NCO-RLi addition groups, and therefore, the trapped rubber ends react with the carbon black and other fillers (specifically, the NCO-RLi reacts with the hydroxyl groups and carboxyl groups of the carbon block or the hydroxyl groups of silica) to thereby prevent an increase in the rubber ends. As shown in Table I, the Mooney viscosity is decreased, the processability is improved, the tan δ (60° C.) is decreased, and the fuel economy is improved.

Examples 4 to 7 and Comparative Examples 3 to 5

All of the ingredients in the formulation shown in Table II (parts by weight) except for the vulcanization accelerator and sulfur were mixed in a 1.8 liter closed type mixer for 3 to 5 minutes. The resultant mixture was discharged when reaching 165±5° C. to obtain a master batch. The vulcanization accelerator and sulfur were mixed into the master batch by an 8-inch open roll to obtain a rubber composition. The rubber composition thus obtained was vulcanized at 160° C. for 10 minutes to prepare a test sample used for the following tests:

300% Modulus (MPa)

This was measured by JIS K 6251.

Tan δ

This was measured using a viscoelasticity spectrometer (made by Toyo Seiki) under conditions of a temperature of 0° C. and 60° C., an initial strain of 10%, a dynamic strain of ±2%, and a frequency of 20 Hz. The smaller the values of the tan δ at 0° C. and 60° C., the lower the heat buildup shown and the lower the rolling resistance.

Abrasion Resistance

This is indexed to the abrasion loss measured using a Lambourn abrasion tester (manufactured by Iwamoto Seisakusho) at a temperature of 20° C.

Abrasion resistance (index)=[(Loss of standard example)/(Loss of sample)]×100

The larger the index, the better the abrasion resistance.

TABLE II

|  | Comp. Ex. 3 | Ex. 4 | Ex. 5 | Ex. 6 | Ex. 7 | Comp. Ex. 4 | Comp. Ex. 5 |
| --- | --- | --- | --- | --- | --- | --- | --- |
| Natural rubber[1] | 100 | 100 | 100 | 100 | 100 | 100 | 100 |
| Carbon black[2] | 50 | 50 | 50 | 50 | 50 | 50 | 50 |
| Radical containing compound[3] | — | 0.05 | 0.15 | 0.25 | 0.4 | 1 | 2 |
| Zinc white | 3 | 3 | 3 | 3 | 3 | 3 | 3 |
| Stearic acid | 2 | 2 | 2 | 2 | 2 | 2 | 2 |
| Anti-aging agent[4] | 1 | 1 | 1 | 1 | 1 | 1 | 1 |
| Vulcanization accelerator[5] | 1 | 1 | 1 | 1 | 1 | 1 | 1 |
| Oil extended powdered sulfur | 2 | 2 | 2 | 2 | 2 | 2 | 2 |
| 300% modulus | 19.2 | 20.5 | 19.6 | 20.0 | 19.7 | 19.1 | 17.8 |
| tan δ (0° C.) | 0.277 | 0.246 | 0.256 | 0.259 | 0.257 | 0.278 | 0.279 |
| tan δ (60° C.) | 0.158 | 0.132 | 0.148 | 0.157 | 0.155 | 0.157 | 0.158 |
| Abrasion resistance | 99.5 | 105.0 | 106.2 | 110.6 | 103.6 | 98.4 | 96.4 |

Notes:
[1]RSS #1
[2]Shoblack N339 made by Showa Cabot and having a nitrogen specific area ($N_2SA$) of 92 $m^2/g$ and a DBP oil absorption of 117 ml/100 g.
[3]Compound shown in the following formula:

[4]N-phenyl-N'-(1,3-dimethylbutyl)-p-phenylenediamine
[5]N-t-butyl-2-benzothiazylsulfenamide As shown in Table II, Examples 4 to 7 containing at least 0.01 part by weight but not more than 1 part by weight of the radical-containing compound of the present invention had lower tan δ values at 0° C. and 60° C. and, therefore, lower heat buildup and were confirmed to be improved in abrasion resistance compared with Comparative Example 3 which did not contain any radical-containing compound. Comparative Example 4 and Comparative Example 5 contained large amounts of the radical-containing compound, but the tan δ failed to sufficiently decrease.

In this way, according to the present invention, by blending, into a rubber composition, at least 0.01 part by weight but less than 1 part by weight of a radical-containing compound having at least one radical having at least one isocyanate group selected from the group consisting of a nitroxide radical, hydrazyl radical, allyloxyl radical, and trytyl radical and existing stably at room temperature in the presence of oxygen, it is possible to obtain a rubber composition having a reduced heat buildup.

Examples 8 to 11 and
Comparative Examples 6 to 8

Synthesis Example

Sn End-Modified SBR 4.4 liters of cyclohexane, 145.6 g of styrene (1.389 mol), and 344.9 g of butadiene (6.376 mol) were charged into a 10 liter autoclave substituted with nitrogen. The mixture was raised in temperature to 50° C. 245.8 μl of tetramethylethylenediamine (1.650 mol) was added, then 2.901 ml of n-butyllithium (4.468 mmol) was added and the mixture stirred at 50° C. When the polymerization conversion rate reached to 100%, 0.8867 ml of stannous tetrachloride n-hexane solution (0.8867 mmol) was added and the resultant mixture was stirred for 30 minutes. Next, methanol was added to terminate the reaction. The polymer solution was taken out, the solvent removed, then the polymer was precipitated in the methanol and dried in vacuo to obtain the Sn end modified SBR.

All of the ingredients in the formulation shown in Table III (parts by weight) except for the vulcanization accelerator and sulfur were mixed in a 1.8 liter closed mixer for 3 to 5 minutes. The resultant mixture was discharged when reaching 165±5° C. to obtain a master batch. The vulcanization accelerator and sulfur were mixed into the master batch by an 8-inch open roll to obtain a rubber composition. The rubber composition thus obtained was vulcanized at 160° C. for 30 minutes to prepare a test sample used for the following test:

Tan δ

0° C. and 60° C.

This was measured using a viscoelasticity spectrometer (made by Toyo Seiki) under conditions of a temperature of

0° C. and 60° C., an initial strain of 10%, a dynamic strain of ±2%, and a frequency of 20 Hz. The higher the value of the tan δ (0° C.), the lower the value of the tan δ (60° C.), and the larger than tan δ (0° C.)/tan δ (60° C.) (tan δ balance), the better the rubber physical properties (in particular the rolling resistance). The results are shown in Table III.

weight of at least one reinforcing agent and at least 0.01 part by weight but less than 0.1 part by weight of a radical containing compound having at least one radical selected from the group consisting of a nitroxide radical, hydrazyl radical, allyloxyl radical, and trytyl radical, also having at least one isocyanate group and existing stably at room temperature in the presence of oxygen.

TABLE III

| | Comp. Ex. 6 | Comp. Ex. 7 | Comp. Ex. 8 | Ex. 8 | Ex. 9 | Ex. 10 | Ex. 11 |
|---|---|---|---|---|---|---|---|
| Unmodified SBR[1] | 100 | 100 | 20 | 20 | 50 | 20 | 20 |
| Sn end-modified SBR[2] | 0 | 0 | 80 | 80 | 50 | 80 | 80 |
| TDI-TEMPO[3] | 0 | 0.05 | 0 | 0.05 | 0.05 | 1 | — |
| TDA-TEMPO[4] | — | — | — | — | — | — | 0.05 |
| Carbon black[5] | 50 | 50 | 50 | 50 | 50 | 50 | 50 |
| Zinc white[6] | 3 | 3 | 3 | 3 | 3 | 3 | 3 |
| Stearic acid[7] | 2 | 2 | 2 | 2 | 2 | 2 | 2 |
| Anti-aging agent 6C[8] | 1 | 1 | 1 | 1 | 1 | 1 | 1 |
| Vulcanization accelerator NS[9] | 1 | 1 | 1 | 1 | 1 | 1 | 1 |
| Sulfur[10] | 2 | 2 | 2 | 2 | 2 | 2 | 2 |
| tan δ (0° C.) | 0.308 | 0.312 | 0.469 | 0.457 | 0.466 | 0.461 | 0.459 |
| tan δ (60° C.) | 0.203 | 0.207 | 0.247 | 0.228 | 0.237 | 0.253 | 0.230 |
| tan δ (0° C.)/tan δ (60° C.) | 1.52 | 1.51 | 1.90 | 2.00 | 1.97 | 1.82 | 2.00 |

Notes:
[1] Nipol 1502 made by Nippon Zeon.
[2] Sn end-modified SBR described in Synthetic Example.
[3]

[4]

[5] Shoblack N339 made by Showa Cabot.
[6] Zinc White No. 3 made by Seido Chemical.
[7] Bis-stearic acid made by Kao Corporation.
[8] N-phenyl-N'-(1,3-dimethylbutyl)-p-phenylenediamine made by Sumitomo Chemical.
[9] N-t-butyl-2-benzothiazylsulfenamide made by Flexsis.
[10] Oil extended powdered sulfur made by Karuizawa Refinery.

Thus, it was learned that the rubber composition according to the present invention had a much lower tan δ at 60° C. and was extremely improved the tan δ balance. Therefore, the rubber composition of the present invention is extremely useful as a rubber composition for a tire.

While the invention has been described with reference to specific embodiment chosen for purpose of illustration, it should be apparent that numerous modifications could be made thereto by those skilled in the art without departing from the basic concept and scope of the invention.

What is claimed is:

1. A rubber composition comprising 100 parts by weight of at least one starting diene rubber, at least 10 parts by weight of at least one reinforcing agent and at least 0.01 part by weight but less than 0.1 part by weight of a radical containing compound having at least one radical selected from the group consisting of a nitroxide radical, hydrazyl radical, allyloxyl radical, and trytyl radical, also having at least one isocyanate group and existing stably at room temperature in the presence of oxygen.

2. A rubber composition as claimed in claim 1, wherein the radical compound has a tetramethylpiperidinyloxy radical.

3. A rubber composition as claimed in claim 1, wherein the radical compound has a urethane bond.

4. A pneumatic tire obtained by a rubber composition according to claim 1.

5. A rubber composition comprising 100 parts by weight of at least one starting Sn coupling diene rubber and 0.01 to 1 part by weight of at least one compound selected from the group consisting of those having a nitroxide radical, hydrazyl radical, allyloxyl radical, trytyl radical, and analogous compounds having in the molecules thereof, also having at least one substituent selected from the group consisting of an isocyanate group, amino group, hydroxyl group, carboxyl group, oxirane group, thiirane group, ester group and amide group and existing stably at room temperature in the presence of oxygen.

6. A rubber composition comprising 100 parts by weight of at least one starting Sn coupling diene rubber and 0.01 to 1 part by weight of at least one radical-containing compound selected from the group consisting of those having a nitroxide radical, hydrazyl radical, allyloxyl radical, trytyl radical and having in the molecules thereof, also having at least one substituent selected from the group consisting of an isocyanate group and/or amino group, an analogus or compound and existing stably at room temperature in the presence of oxygen.

7. A rubber composition as claimed in claim 5, wherein the radical compound is a tetramethylpiperidinyloxy radical.

8. A pneumatic tire obtained by using a rubber composition according to claim 5.

* * * * *